(12) United States Patent
Mitsunaga et al.

(10) Patent No.: US 7,043,360 B2
(45) Date of Patent: May 9, 2006

(54) SENSOR UNIT

(75) Inventors: Tomiyuki Mitsunaga, Onojo (JP);
Takashi Matsuoka, Fukuoka (JP);
Hisayuki Ichiba, Onojo (JP); Hiroshi Magori, Kasuga (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 74 days.

(21) Appl. No.: 10/674,430

(22) Filed: Oct. 1, 2003

(65) Prior Publication Data

US 2004/0068367 A1    Apr. 8, 2004

(30) Foreign Application Priority Data

Oct. 2, 2002    (JP)    ............... 2002-290053

(51) Int. Cl.
*G01C 21/00*    (2006.01)
(52) U.S. Cl. .............. 701/209; 701/216; 701/217; 342/357.14
(58) Field of Classification Search ............... 701/209, 701/213, 216, 217, 220; 342/357.01, 357.14
See application file for complete search history.

(56) References Cited

U.S. PATENT DOCUMENTS

| | | | |
|---|---|---|---|
| 4,849,827 A | 7/1989 | Hashimoto et al. | 386/108 |
| 6,008,756 A | 12/1999 | Boerhave et al. | 342/357.1 |
| 6,037,893 A * | 3/2000 | Lipman | 342/25 R |
| 6,127,970 A * | 10/2000 | Lin | 342/357.14 |
| 6,249,246 B1 * | 6/2001 | Bode et al. | 342/357.14 |
| 6,298,316 B1 * | 10/2001 | Diesel | 702/190 |
| 6,522,266 B1 * | 2/2003 | Soehren et al. | 340/988 |
| 6,641,090 B1 * | 11/2003 | Meyer | 246/122 R |
| 6,647,352 B1 * | 11/2003 | Horton | 702/151 |
| 6,721,657 B1 * | 4/2004 | Ford et al. | 701/213 |
| 6,754,584 B1 * | 6/2004 | Pinto et al. | 701/215 |

FOREIGN PATENT DOCUMENTS

| | | |
|---|---|---|
| DE | 25 49 791 | 5/1977 |
| EP | 0 545 636 | 6/1993 |
| JP | 04-326202 | 11/1992 |
| JP | 2003-509700 | 3/2003 |
| WO | 95/28650 | 10/1995 |

OTHER PUBLICATIONS

H.A. Malliot, "Digital Terrain Elevation Mapping System," Aerospace Applications Conference, 1996. Proceedings., 1996 IEEE ASPEN, Co, U.S.A., Feb. 3, 1996, New York, NY, pp. 91-105, XP010159095, ISBN: 0-7803-3196-6—Figure 3.

* cited by examiner

*Primary Examiner*—Tan Q. Nguyen
(74) *Attorney, Agent, or Firm*—Wenderoth, Lind & Ponack, L.L.P.

(57) ABSTRACT

In a sensor unit, an antenna section receives a high-frequency signal transmitted from a positioning system for output to a combining circuit. Also, in the sensor unit, a sensor section detects an angular velocity around one axis, and further detects an acceleration in directions of two axes (that is, X and Y axes). Furthermore, the sensor section uses the detected angular velocity and acceleration to generate a data unit including at least data indicative of the angular velocity and data indicative of the acceleration. The sensor section then performs a digital modulation process with the generated data unit. The combining circuit combines the high-frequency signal output from the antenna section and a digital modulated signal output from the sensor section, and then outputs the resultant composite signal to a coaxial cable.

10 Claims, 6 Drawing Sheets

SENSOR UNIT

BACKGROUND OF THE INVENTION

1. Field of the Invention

The present invention relates to sensor units and, more specifically, to a sensor unit including sensors required for autonomous navigation of a mobile unit.

2. Description of the Background Art

A navigation system is a system which is mounted on a mobile unit, such as a vehicle, and is equipped with a locating unit for identifying the current position of the mobile unit. Specifically, the locating unit receives, via an antenna unit, a high-frequency signal from a positioning system, such as the Global Positioning System (GPS), while the mobile unit is moving within an area where such a high-frequency signal can be received. With the use of the received high-frequency signal, the locating unit derives the current position of the mobile unit. While the mobile unit is moving within an area where a high-frequency signal cannot be received, such as a road in a tunnel, the locating unit uses signals output from an autonomous navigation sensor, typified by a combination of an acceleration sensor and a gyro sensor, to derive the current position of the mobile unit.

FIG. 5 is a block diagram illustrating the configuration of a conventional navigation system. FIG. 6A is an external perspective view of the navigation system illustrated in FIG. 5. FIG. 6B is an internal perspective view of a sensor unit 80 illustrated in FIG. 6A. In FIGS. 5, 6A, and 6B, the navigation system includes an antenna unit 70, the sensor unit 80, and a locating unit 90.

The antenna unit 70 has a rectangular parallelepiped shape having a width of L1, a length of L2, and a height of t1 (refer to FIG. 6A), and is connected to the locating unit 90 via a first signal cable 71. Here, by way of example only, L1 and L2 are approximately 30 mm each, and t1 is approximately 10 mm. The antenna unit 70 accommodates an antenna element 72 and a low noise amplifier (LNA) 73. As for the antenna unit 70, various structures have been suggested (for example, refer to Japanese Patent Laid-Open Publication No. 1992-326202).

The antenna element 72 receives a high-frequency signal from a positioning system for output to the LNA 73. The LNA 73 amplifies the received high-frequency signal, and sends the amplified signal to the first signal cable 71. Such an output high-frequency signal is transmitted via the first signal cable 71 to the locating unit 90.

The sensor unit 80 has a rectangular parallelepiped shape having a width of L3, a length of L4, and a height of t2 (refer to FIG. 6A), and is connected to the locating unit 90 via a second signal cable 81. Here, by way of example only, L3 and L4 are approximately 60 mm each, and t2 is approximately 35 mm. The sensor unit 80 accommodates at least, as an autonomous navigation sensor, a gyro sensor 82 and an acceleration sensor 83 (refer to FIG. 5 and FIG. 6B). The gyro sensor 82 detects an angular velocity around a first axis (that is, Z axis), and transmits an angular velocity signal to the locating unit 90 via the second signal cable 81. The acceleration sensor 83 detects accelerations along second and third axes (that is, X and Y axes), and transmits an acceleration signal indicative of the detected accelerations to the locating unit 90 via the second signal cable 81.

The locating unit 90 includes at least a receiver 91 and a CPU (Central Processing Unit) 92. The receiver 91 receives a signal transmitted through the first signal cable 71. With the use of the received signal, the receiver 91 derives the current position of the mobile unit for output to the CPU 92. The CPU 92 uses the angular velocity signal and the acceleration signal transmitted via the second signal cable 81 to derive the current position of the mobile unit. Also, the CPU 92 uses the current position received from the receiver 91 and/or the current position derived by itself to perform a process required for navigation of the mobile unit.

In the above-described navigation system, however, the locating unit 90 has connected thereto the antenna unit 70 via the first signal cable 71 and the sensor unit 80 via the second signal cable 81. This configuration disadvantageously increases the volume of the navigation system, and also complicates installation or electric wiring of the navigation system.

SUMMARY OF THE INVENTION

Therefore, an object of the present invention is to provide a sensor unit which contributes to downsizing of a navigation system, or easy installation or simple electric wiring of the navigation system.

In order to achieve the object mentioned above, a first aspect of the present invention is directed to a sensor unit which includes: an antenna section including at least an antenna element for receiving a high-frequency signal from an external positioning system; a sensor section including at least a gyro sensor for detecting an angular velocity of the mobile unit and an acceleration sensor for detecting an acceleration of the mobile unit; a combining circuit including at least a first signal line through which the high-frequency signal output from the antenna section is transmitted, a second signal line through which a signal output from the sensor section is transmitted, and a node, which is a connecting point of the first signal line and the second signal line; and a casing for accommodating the antenna section, the sensor section, and the combining circuit.

Here, at the node, the sensor unit combines at least the high-frequency signal output from the antenna section and the signal output from the sensor section, and generates a composite signal.

Also, preferably, the sensor section further includes: an A/D converter for converting at least the angular velocity detected by the gyro sensor and the acceleration detected by the acceleration sensor to digital angular velocity data and digital acceleration data, respectively; a processor for generating a data unit including at least the angular velocity data and the acceleration data obtained through conversion by the A/D converter; and a digital modulator for digitally modulating an input carrier with the data unit generated by the processor and generating a digital modulated signal. Here, at the node, the sensor unit combines at least the high-frequency signal output from the antenna section and the digital modulated signal generated by the digital modulator, and generates a composite signal.

Furthermore, preferably, a frequency of the carrier is lower than a lower limit of an occupied frequency bandwidth of the high-frequency signal. Specifically, the high-frequency signal is sent from the Global Positioning System (GPS) as the positioning system, and has a center frequency of 1.575 GHz. Also, the digital modulated signal is generated by digitally modulating an amplitude of a carrier having a frequency of 500 kHz with the data unit.

Still further, preferably, the sensor section further includes: a barometric pressure sensor for detecting a barometric pressure in the vicinity of the mobile unit; and a temperature sensor for detecting a temperature in the vicinity of the temperature sensor. Here, the A/D converter further converts the barometric pressure detected by the barometric pressure sensor and the temperature detected by the temperature sensor to digital barometric pressure data and digital temperature data, respectively. The data unit generated by the processor further includes the barometric pressure data and the temperature data converted by the A/D converter.

Still further, preferably, the combining circuit further includes: a high-pass filter, placed between the antenna section and the first signal line, for passing a signal having a frequency equal to or higher than a lower limit of a frequency bandwidth occupied by the high-frequency signal; a band-pass filter, connected to the digital modulator, for passing a signal having a frequency bandwidth occupied by the digital modulated signal; and a band elimination filter, placed between the second signal line and the band-pass filter, for passing a signal having a frequency outside the frequency bandwidth occupied by the high-frequency signal.

Still further, the sensor unit further includes: a substrate having placed thereon at least the sensor section and the combining circuit, and being accommodated in the casing; and an accommodation box accommodating an entirety or part of the sensor section and/or the combining circuit, having an upper surface tilted with respect to a bottom surface of the casing, and being formed on the substrate. Here, at least the antenna element is placed on the upper surface of the accommodation box.

A second aspect of the present invention is directed to a locating unit connected to a sensor unit and mounted on a mobile unit. The sensor unit sends a composite signal obtained by combining a high-frequency signal transmitted from an external positioning system and a digital modulated signal obtained by modulating a carrier with a data unit including at least angular velocity data indicative of an angular velocity of the mobile unit in a digital format and acceleration data indicative of an acceleration of the mobile unit in a digital format. The locating unit includes: a dividing circuit for dividing, in response to reception of the composite signal sent from the sensor unit, the received composite signal into the high-frequency signal and the digital modulated signal; a receiver for performing, in response to reception of the high-frequency signal obtained through division by the dividing circuit, a predetermined process on the received high-frequency signal and calculating a current position of the mobile unit; a digital demodulator for demodulating the digital modulated signal obtained through division by the dividing circuit and reproducing the data unit; and a processor for deriving an azimuth angle and a travel distance of the mobile unit from the angular velocity data and the acceleration data included in the data unit reproduced by the digital demodulator and calculating a current position of the mobile unit by using the derived azimuth angle and travel distance.

Also, preferably, the data unit further includes barometric pressure data indicative of a barometric pressure in the mobile unit in a digital format and temperature data indicative of a temperature in the mobile unit in a digital format, respectively. The processor derives a change in altitude of the mobile unit based on the barometric pressure data included in the data unit reproduced by the digital demodulator, and calculates the current position of the mobile unit by further using the derived change in altitude. Also, the processor derives the temperature in the mobile unit from the temperature data included in the data unit reproduced by the digital demodulator.

Furthermore, preferably, the processor further corrects the derived azimuth angle, travel distance, and change in altitude by using the derived temperature.

According to the first aspect of the present invention, the sensor unit includes the combining circuit for combining at least the high-frequency signal output from the antenna section and the digital modulated signal output from the sensor section. With this, it is possible to collectively accommodate the antenna section and the sensor section in the casing of the sensor unit. With this, the outer dimension of the sensor unit itself can be made small. As a result, it is possible to provide a sensor unit which contributes to downsizing of the entire navigation system. Furthermore, the downsizing of the sensor unit makes it possible to place the sensor unit in an area narrower than ever. As a result, such a sensor unit can contribute to easy installation of the navigation system.

Also, according to the sensor unit of the present invention, by appropriately selecting the carrier frequency of the digital modulated signal and providing a plurality of appropriate filters to the combining circuit, it is possible to prevent interference between the high-frequency signal and the digital modulated signal included in the composite signal. As a result, the sensor unit and the locating unit can be connected by using a single transmission path. Therefore, it is possible to provide a sensor unit which contributes to easy installation or simple electric wiring of the navigation system.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
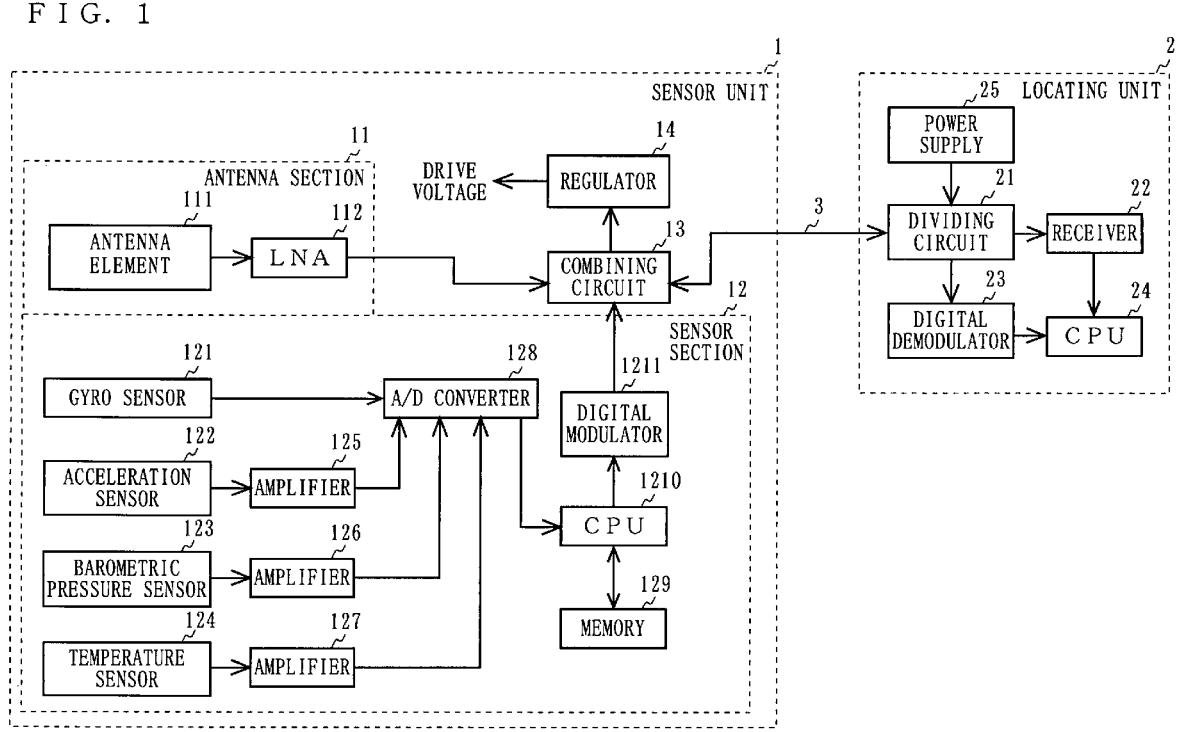
FIG. 1 is a block diagram schematically illustrating the configuration of a sensor unit 1 and a locating unit 2 according to one embodiment of the present invention.

FIG. 1 is a block diagram schematically illustrating the configuration of a sensor unit 1 and a locating unit 2 according to one embodiment of the present invention. In FIG. 1, the sensor unit 1 is placed at a predetermined location (a dashboard, for example) in a mobile unit, such as a vehicle, and is connected to the locating unit 2 via, for example, a coaxial cable 3.

The above-structured sensor unit 1 includes at least an antenna section 11, a sensor section 12, and a combining circuit 13. Preferably, the sensor unit 1 includes a regulator 14.

The antenna section 11 includes an antenna element 111 and a low noise amplifier (LNA) 112. The antenna element 111 receives a high-frequency signal transmitted from a positioning system for output to the LNA 112. Here, when the positioning system being used is the Global Positioning System (GPS), the high-frequency signal occupies a band around 1.575 GHz. The LNA 112 amplifies the received high-frequency signal for output to the combining circuit 13.

The sensor section 12 includes a gyro sensor 121, an acceleration sensor 122, a barometric pressure sensor 123, a temperature sensor 124, three amplifiers 125 through 127, an A/D converter 128, a memory 129, a CPU 1210, and a digital modulator 1211.

The gyro sensor 121 detects an angular velocity around at least a first axis (that is, Z axis), and then outputs an analog signal indicative of the detection results (hereinafter referred to as an angular velocity signal) to the A/D converter 128.

The acceleration sensor 122 detects accelerations in directions of at least second and third axes (that is, X and Y axes), and then outputs an analog signal indicative of the detection results in the respective directions (hereinafter referred to as an acceleration signal) to the amplifier 125.

The barometric pressure sensor 123 detects a barometric pressure in the vicinity of the sensor unit 1, and then outputs an analog signal indicative of the detection results (hereinafter referred to as a barometric pressure signal) to the amplifier 126.

The temperature sensor 124 detects a temperature in the vicinity of the temperature sensor 124, and then outputs an analog signal indicative of the detection results (hereinafter referred to a temperature signal) to the amplifier 127. Here, the temperature signal is used in order to correct fluctuations in the detection results of the gyro sensor 121, the acceleration sensor 122, and the barometric pressure sensor 123. For this purpose, the temperature sensor 124 is preferably placed in the vicinity of these sensors 121, 122, and 123.

The amplifiers 125, 126, and 127 amplify the received acceleration signal, barometric pressure signal, and temperature signal, respectively. The amplified acceleration signal, barometric pressure signal, and temperature signal are all output to the A/D converter 128.

The A/D converter 128 converts the received angular velocity signal, acceleration signal, barometric pressure signal, and temperature signal to digital data. The resultant angular velocity data, acceleration data, barometric pressure data, and temperature data are output to the CPU 1210.

The memory 129 is EEPROM (Electrically Erasable Programmable Read-Only Memory), for example, and stores at least a computer program for defining the operation of the CPU 1210.

The CPU 1210 operates by following the computer program stored in the memory 129 to control each component forming the sensor unit 1. A typical operation of the CPU 1210 is to generate a data unit which includes the received angular velocity data, acceleration data, barometric pressure data, and temperature data and which is in a predetermined format. Here, the data unit is a minimum unit of data to be transmitted at a time to the locating unit 2. The generated data unit is output to the digital modulator 1211.

The digital modulator 1211 digitally modulates an input carrier (not shown) with the received data unit, and then outputs the resultant digital modulated signal to the combining circuit 13. Here, the carrier has a frequency at which at least the occupied frequency bandwidth of the digital modulated signal and the occupied frequency bandwidth of the above-stated high-frequency signal do not interfere with each other. Preferably, the carrier frequency is selected so as to be lower than a lower limit of the occupied frequency bandwidth of the high-frequency signal and so that the digital modulated signal and the high-frequency signal do not interfere with each other. Here, when the positioning system is the GPS, the high-frequency signal occupies a band around 1.575 GHz. In the present embodiment, the carrier frequency is selected at 500 kHz, for example. With such a carrier frequency being selected, it is possible to prevent interference between medium waves used in radio broadcasting receivable in the vehicle, for example, and the high-frequency signal and the digital modulated signal. Also, typical examples of a digital modulation scheme to be used are ASK (Amplitude Shift Keying), FSK (Frequency Shift Keying), and PSK (Phase Shift Keying). Alternatively, any known digital modulation scheme can be used.

Figure 2:
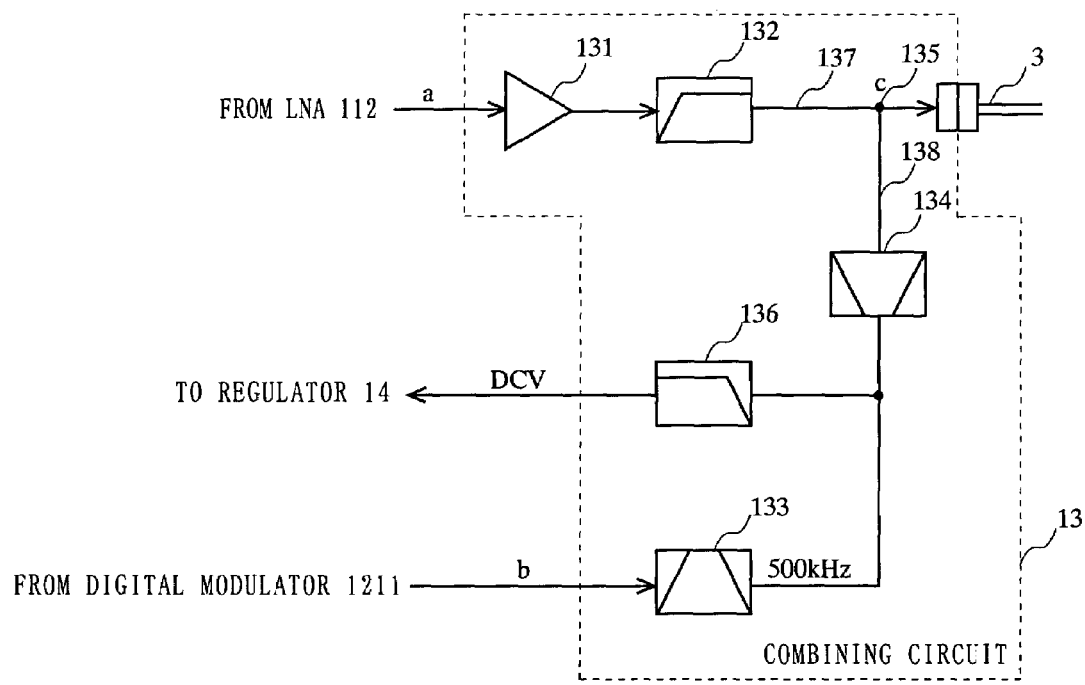
FIG. 2 is a schematic view illustrating a detailed configuration of the combining circuit 13 illustrated in FIG. 1.

FIG. 2 is a schematic view illustrating a detailed configuration of the combining circuit 13 illustrated in FIG. 1. With reference to FIG. 2, the combining circuit 13 is described below. The combining circuit 13 combines the high-frequency signal output from the antenna section 11 and the digital modulated signal output from the sensor section 12. For the purpose of performing such a combining process, the combining circuit 13 includes an amplifier 131, a high-pass filter (HPF) 132, a band-pass filter (BPF) 133, a band elimination filter (BEF) 134, and a node 135. Preferably, the combining circuit 13 further includes a low-pass filter (LPF) 136.

The amplifier 131 is connected to the LNA 112 (refer to FIG. 1) via a signal line to amplify the high-frequency signal output from the LNA 112, and outputs the amplified high-frequency signal.

The HPF 132 is connected to the amplifier 131 via a signal line to pass a signal having a frequency equal to or higher than the lower limit of the frequency bandwidth occupied by the high-frequency signal.

The BPF 133 is connected to the digital modulator 1211 (refer to FIG. 1) via a signal line to pass a signal included in the frequency bandwidth occupied by the digital modulated signal. Note that the combining circuit 13 can include a low-pass filter, in place of the BPF 133, for passing only a signal having a frequency equal to or lower than the upper limit of the frequency bandwidth occupied by the digital modulated signal. In this case, however, when a direct-current (DC) voltage is supplied from the locating unit 2 to the sensor unit 1 via the coaxial cable 3, the DC voltage and the digital modulated signal interfere with each other. Therefore, when a low-pass filter is used in place of the BPF 133, a DC voltage should be supplied via another route.

The BEF 134 is connected to at least the BPF 133 via a signal line to pass a signal having a frequency outside the frequency bandwidth occupied by the high-frequency signal. The BEF 134 has an output terminal connected to a second signal line 138, which is further connected to a first signal line 137.

The node 135 is a connecting point of the first signal line 137 and the second signal line 138. This node 135 is supplied with the high-frequency signal output from the HPF 132 and the digital modulated signal output from the BEF 134. These signals are combined at the node 135 and, as a result, a composite signal is generated. Such a composite signal is transmitted via the coaxial cable 3 to the locating unit 2.

Also, the LPF 136 is connected to at least a signal line connecting the BPF 133 and the BEF 134 together, and substantially passes only a direct-current component.

Now, referring back to FIG. 1, the regulator 14 generates, from the DC voltage supplied by the locating unit 2, a drive voltage having a predetermined value to distribute power to each component of the sensor unit 1. This drive voltage enables each component of the sensor unit 1 to operate.

In FIG. 1, the locating unit 2 is provided to a navigation system, and is mounted on a mobile unit (a vehicle, for example) for at least calculating the current position of the mobile unit. For the purpose of performing such a calculating process, the locating unit 2 includes a dividing circuit 21, a receiver 22, a digital demodulator 23, and a CPU 24. Preferably, the locating unit 2 includes a power source 25.

The dividing circuit 21 has the above-stated coaxial cable 3 connected thereto. Through this coaxial cable 3, the dividing circuit 21 receives the composite signal sent from the sensor unit 1. The dividing circuit 21 performs a process in reverse to the process performed by the combining circuit 13. That is, the dividing circuit 21 divides the received composite signal into the high-frequency signal and the digital modulated signal, and then outputs the high-frequency signal and the digital modulated signal to the receiver 22 and the digital demodulator 23, respectively.

The receiver 22 performs a predetermined process on the high-frequency signal output from the dividing circuit 21 to derive the current position of the mobile unit on which the locating unit 2 is mounted, and then transmits the derived results to the CPU 24.

The digital demodulator 23 demodulates the digital modulated signal output from the dividing circuit 21 to reproduce a data unit. Furthermore, the digital demodulator 23 outputs the reproduced data unit to the CPU 24.

The CPU 24 operates by following a computer program (not shown) to control each component of the locating unit 2. The CPU 24 extracts, from the received data unit, the angular velocity data, the acceleration data, the barometric pressure data, and the temperature data. The CPU 24 then calculates an azimuth angle of the mobile unit from the extracted angular velocity data, a travel distance of the mobile unit from the extracted acceleration data, a change in altitude of the mobile unit from the barometric pressure data currently and previously extracted, and a temperature in the vicinity of the sensor unit 1 from the extracted temperature data. The CPU 24 then calculates the current position of the mobile unit from the calculated azimuth angle, travel distance, and change in altitude. In some cases, due to the temperature in the vicinity of the sensor unit 1, an error may occur in the calculated azimuth angle, travel distance, and change in altitude. In consideration of such cases, the CPU 24 preferably corrects these azimuth angle, travel distance, and change in altitude based on the current temperature. By using thus corrected azimuth angle, travel distance, and change in altitude, the CPU 24 can calculate the correct current position of the mobile unit. Furthermore, the CPU 24 performs a process required for navigation of the mobile unit by using the current position received from the receiver 22 and/or the current position calculated by itself.

The power source 25 generates a DC voltage. The generated DC voltage is fed via the dividing circuit 21 and the coaxial cable 3 to the combining circuit 13 included in the sensor unit 1.

The coaxial cable 3 has a core wire and an outer conductor (braided) for connection to the sensor unit 1 and the locating unit 2. Specifically, the core wire connects the sensor unit 1 and the locating unit 2 together, and the outer conductor is grounded.

Figure 3:
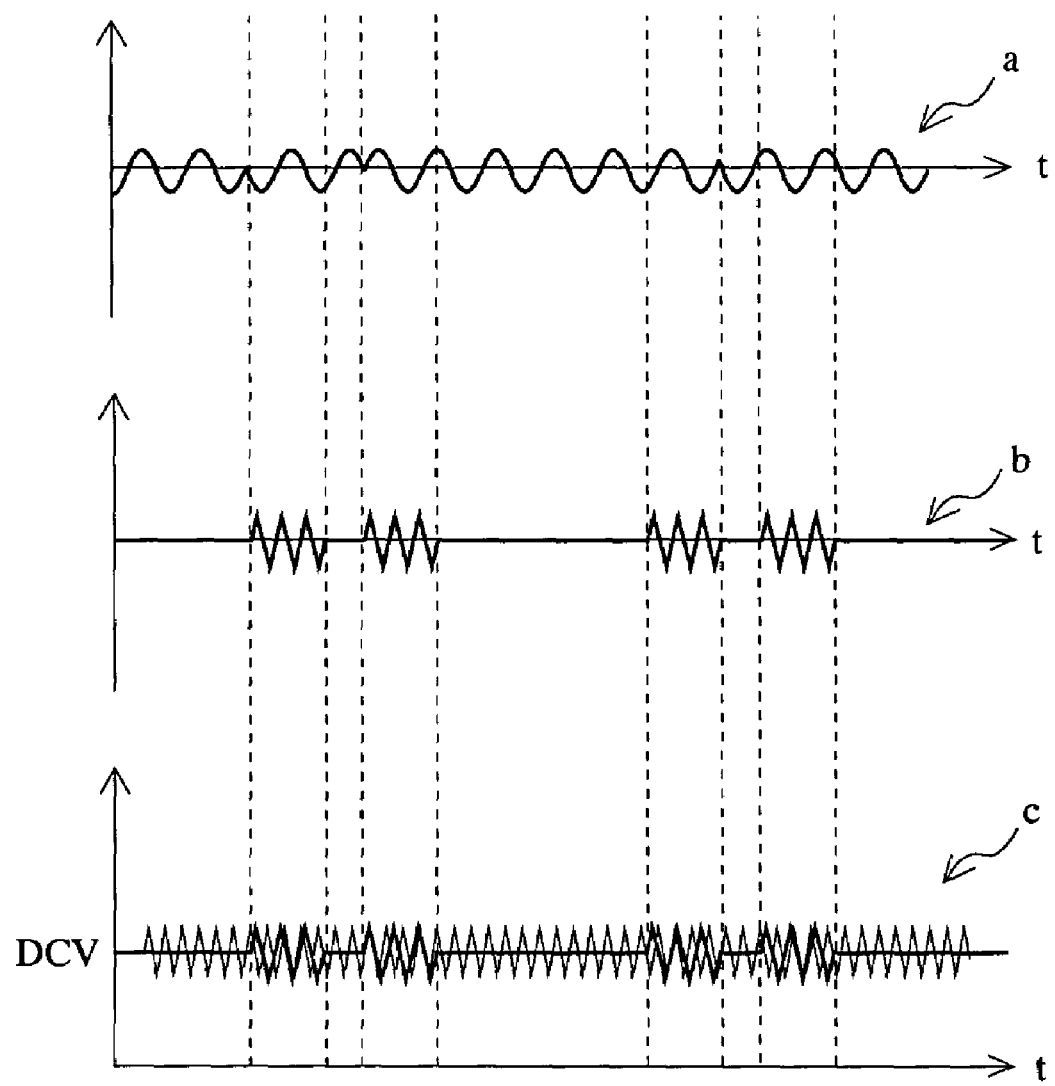
FIG. 3 is a schematic view of waveforms of signals at points a through c in the sensor unit 1.

FIG. 3 is a schematic view of waveforms of signals at points a through c in the sensor unit 1. Specifically, in FIG. 3, a time waveform of the high-frequency signal at a point a, that is, the output end of the antenna section 11, is illustrated on top of FIG. 3, a time waveform of the digital modulated signal at a point b, that is, the output end of the digital modulator 1211, is illustrated in the middle of FIG. 3, and a time waveform of the composite signal at a point c, that is, the node 135, is illustrated at the bottom of FIG. 3. In FIG. 3, the illustrated time waveforms of the high-frequency signal and the digital modulated signal are for a case where the positioning system is the GPS and the digital modulation scheme is ASK. With reference to FIG. 3, the operation of the sensor unit 1 illustrated in FIGS. 1 and 2 is described below. First, the high-frequency signal output from the antenna section 11 (refer to the top in FIG. 3) goes through the amplifier 131, the HPF 132, and then the first signal line 137 to the coaxial cable 3. The digital modulated signal output from the digital modulator 1211 (refer to the middle in FIG. 3) goes through the BPF 133, the BEF 134, the second signal line 138, and then the first signal line 137 to the coaxial cable 3.

Preferably, in the present embodiment, the DC voltage generated by the power source 25 of the locating unit 2 is fed to the first signal line 137. This DC voltage (DCV) is further fed via the second signal line 138, the BEF 134, and then the LPF 136 to the regulator 14.

Therefore, in the present embodiment, the node 135 is supplied with the composite signal added with the DC voltage (refer to the bottom in FIG. 3), as well as the high-frequency signal and the digital modulated signal.

The HPF 132 passes the high-frequency signal, but does not pass the digital modulated signal having a frequency lower than the high-frequency signal, and the DC voltage. That is, the HPF 132 is a high impedance circuit having a high input impedance for the digital modulated signal and the DC voltage. On the other hand, the BEF 134 does not pass the high-frequency signal, and therefore is a high impedance circuit having a high input impedance for the high-frequency signal. The LPF 136 does not pass the digital modulated signal, and therefore is a high impedance circuit having a high input impedance for the digital modulated signal. As a result, the DC voltage from the locating unit 2 is given to the LPF 136 via the node 135 and the BEF 134. The LPF 136 passes only a signal having a frequency of substantially 0, and therefore passes the received DC voltage (DCV) for output to the regulator 14. The high-frequency signal and the digital modulated signal are output through the first signal line 137 to the coaxial cable 3. As clear from the above description, with the combining circuit 13 being structured as illustrated in FIG. 2, it is possible to prevent interference between the digital modulated signal and the DC voltage.

Figure 4A:
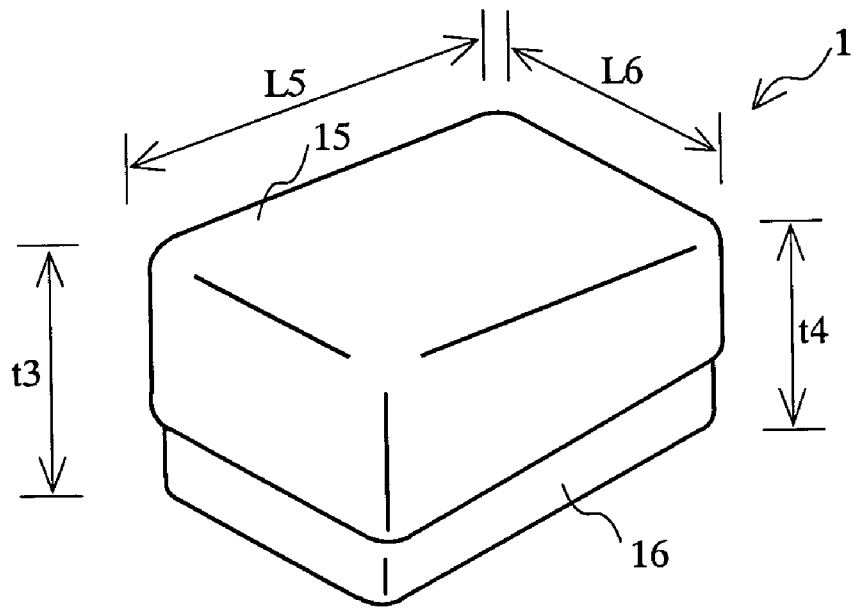
FIG. 4A is an external perspective view of the sensor unit 1 illustrated in FIG. 1.
Figure 4B:
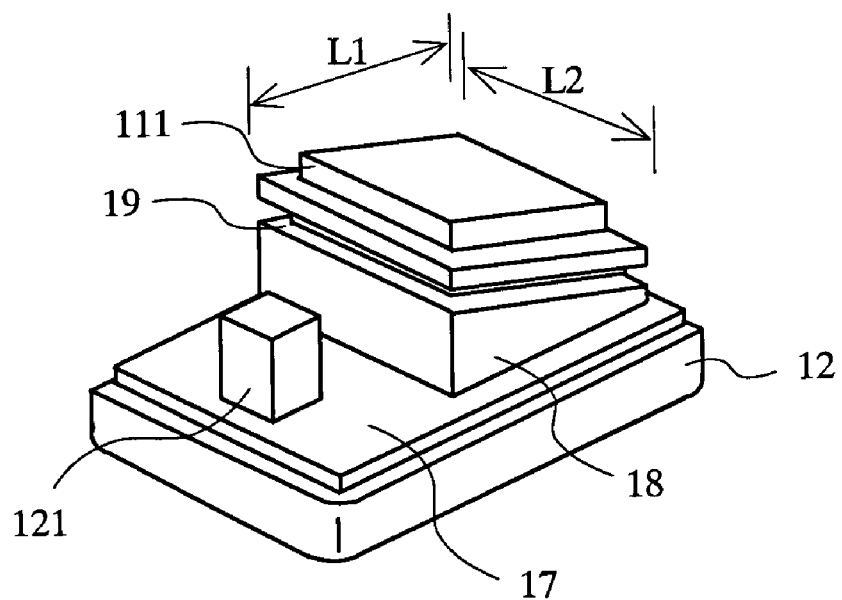
FIG. 4B is a perspective view of the sensor unit 1 with an upper casing 15 illustrated in FIG. 4A being removed therefrom.
Figure 5:
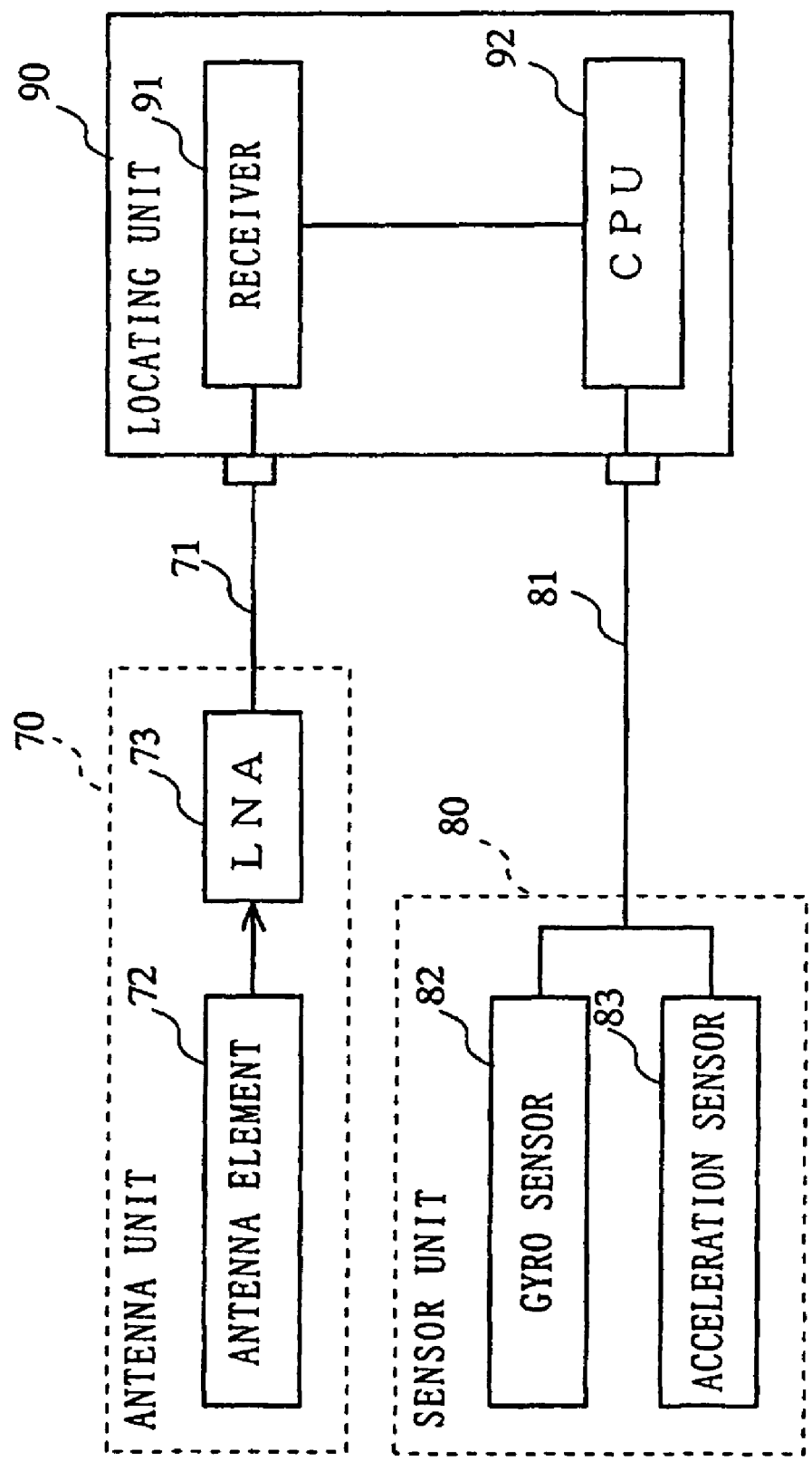
FIG. 5 is a block diagram illustrating the configuration of a general navigation system.
Figure 6A:
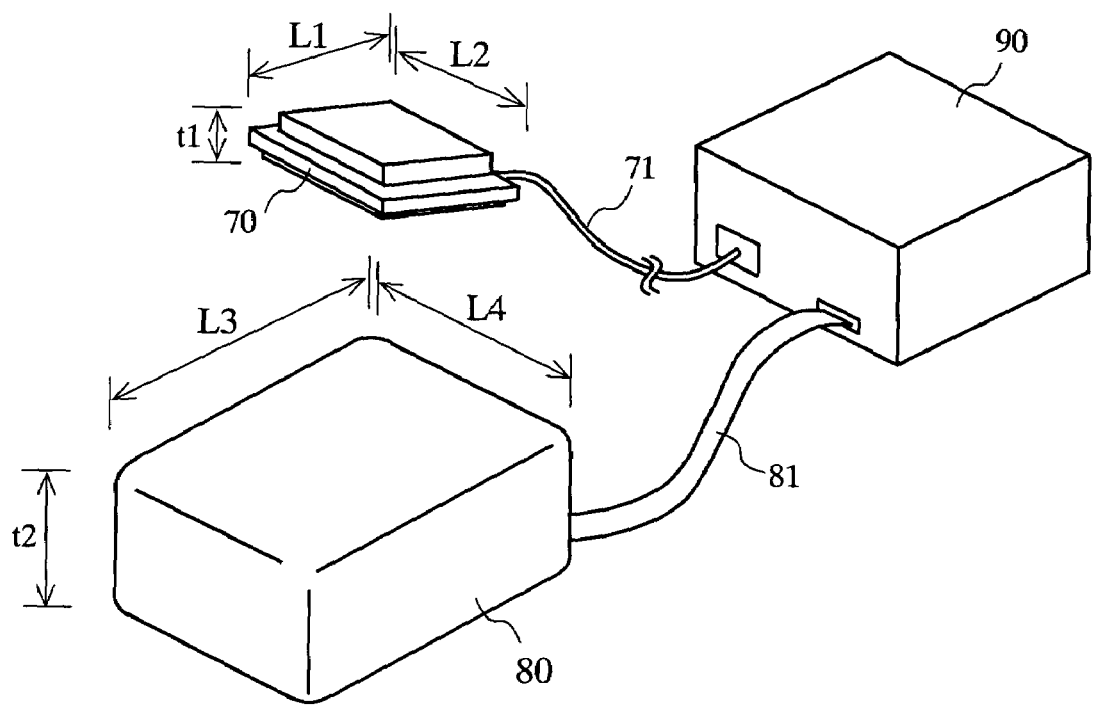
FIG. 6A is an external perspective view of the navigation system illustrated in FIG. 5.
Figure 6B:
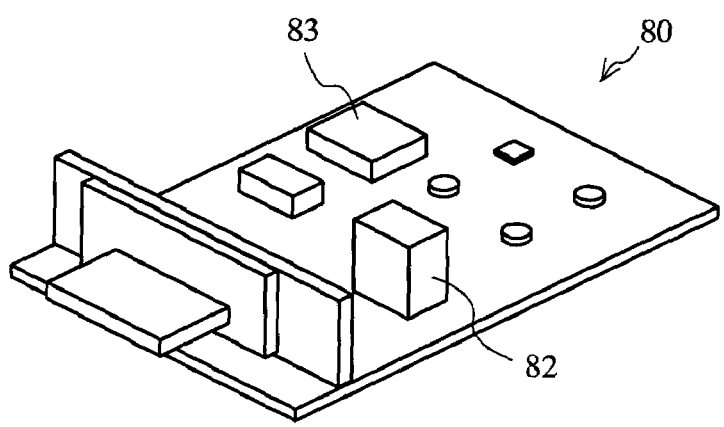
FIG. 6B is an internal perspective view of a sensor unit 80 illustrated in FIG. 6A.

FIG. 4A is an external perspective view of the sensor unit 1 illustrated in FIG. 1. FIG. 4B is a perspective view of the sensor unit 1 with an upper casing 15 illustrated in FIG. 4A being removed therefrom. In FIGS. 4A and 4B, the sensor unit 1 includes, in addition to the components illustrated in FIG. 1, the upper casing 15, a lower casing 16, a substrate 17, and an accommodation box 18. The outer shape of the sensor unit 1 is defined by a combination of the upper casing 15 and the lower casing 16 which forms a space for accommodating the structure illustrated in FIG. 1. Specifically, as evident from FIG. 4A, the bottom surface of the sensor unit 1 is shaped like a rectangle having a length of L5 and a width of L6. Also, the upper surface of the sensor unit 1 is shaped like a rectangle, and is preferably tilted with respect to the bottom surface. With the tilted upper surface, the sensor unit 1 has a maximum height of t3 and a minimum height of t4. Typically, L5 is approximately 60 mm, L6 is approximately 45 mm, t3 is approximately 30 mm, and t4 is approximately 20 mm. By way of example only, the upper casing 15 and the lower casing 16 are held by together at least one screw.

The accommodation space of the lower casing 16 accommodates the substrate 17 having a main surface on which the sensor section 12, the combining circuit 13, and the regulator 14 are placed, with the main surface of the substrate 17 being substantially parallel to the bottom surface of the sensor unit 1. The accommodation box 18 is formed so as to cover the sensor section 12, the combining circuit 13, and the regulator 14 on the substrate 17, except for the gyro sensor 121. An upper surface (tilted surface) 19 of the accommodation box 18 is tilted with respect to the main surface of the substrate 17. The tilted surface 19 is preferably parallel to the upper surface of the upper casing 15 in view of downsizing of the sensor unit 1. On the upper surface 19 of the accommodation box 18, at least the antenna element 111 is placed. In the embodiment, preferably, the LNA 112 is also placed on the upper surface 19.

As such, by being placed on the tilted surface 19, the antenna element 111 can be easily directed in a direction of an artificial satellite of the positioning system when, for example, the sensor unit 1 is placed on the dashboard of the vehicle. Also, the gyro sensor 121 is preferably placed as far as possible from the antenna element 111. This is because, if the gyro sensor 121 which has a relatively large outer dimension is placed in the vicinity of the antenna element 111, the reception sensitivity of the antenna element 111 is deteriorated. Thus, according to the present embodiment, the gyro sensor 121 is placed outside the accommodation box 18. However, if the gyro sensor 121 has a small outer dimension so as not to affect the reception sensitivity of the antenna element 111, the gyro sensor 121 can be accommodated in the accommodation box 18.

As such, according to the present embodiment, the sensor unit 1 includes the combining circuit 13 for combining at least the high-frequency signal output from the antenna section 11 and the digital modulated signal output from the sensor section 12. With this, it is possible to collectively accommodate the antenna section 11 and the sensor section 12 in the casing of the sensor unit 1. With this, the outer dimension of the sensor unit 1 itself can be made small. As a result, it is possible to provide the sensor unit 1 which contributes to downsizing of the entire navigation system. Furthermore, the downsizing of the sensor unit 1 makes it possible to place the sensor unit 1 in an area narrower than ever. As a result, such a sensor unit 1 can contribute to easy installation of the navigation system.

Still further, according to the sensor unit 1, with the combining circuit 13 being structured as illustrated in FIG. 2, at least the high-frequency signal and the digital modulated signal can be sent without interfering with each other to the locating unit 2 by using the core wire of the coaxial cable 3. Still further, with the above-structured combining circuit 13, a DC voltage can be supplied from the locating unit 2 to the sensor unit 1. Therefore, it is possible to provide the sensor unit 1 which can contribute to easy installation or simple electric wiring of the navigation system.

According to the sensor unit 1, the carrier frequency of the digital modulated signal is selected at 500 kHz. This can prevent interference with, for example, a medium wave for use in radio broadcasting.

In the above embodiment, the sensor unit 1 and the locating unit 2 are connected to each other by the coaxial cable 3. This is not meant to be restrictive. Alternatively, both units can be connected by a wired transmission line, such as a bus line, or a wireless transmission path.

While the invention has been described in detail, the foregoing description is in all aspects illustrative and not restrictive. It is understood that numerous other modifications and variations can be devised without departing from the scope of the invention.

What is claimed is:

1. A sensor unit for mounting on a mobile unit, the sensor unit comprising:
   an antenna section including at least an antenna element for receiving a high-frequency signal from an external positioning system;
   a sensor section including at least a gyro sensor for detecting an angular velocity of the mobile unit and an acceleration sensor for detecting an acceleration of the mobile unit;
   a combining circuit including at least a first signal line through which the high-frequency signal output from said antenna section is sent, a second signal line through which a signal output from said sensor section is sent, and a node for generating a composite signal by combining the high-frequency signal from said antenna section and the signal output from said sensor section such that the high-frequency signal and the signal occupy different frequency bandwidths and are output from said node simultaneously, said node being a connection point of said first signal line and said second signal line; and
   a casing accommodating said antenna section, said sensor section, and said combining circuit.

2. The sensor unit according to claim 1, wherein said sensor section further includes:
   an A/D converter for converting at least the angular velocity detected by said gyro sensor to digital angular velocity data and the acceleration detected by said acceleration sensor to digital acceleration data;
   a processor for generating a data unit including at least the digital angular velocity data and the digital acceleration data obtained through conversion by said A/D converter; and
   a digital modulator for digitally modulating an input carrier with the data unit generated by said processor and generating a digital modulated signal, and
   at said node, the sensor unit combines at least the high-frequency signal output from said antenna section with the digital modulated signal generated by said digital modulator, and generates the composite signal.

3. The sensor unit according to claim 2, wherein a frequency of the input carrier is lower than a lower limit of an occupied frequency bandwidth of the high-frequency signal.

4. The sensor unit according to claim 3, wherein the high-frequency signal is sent from the GPS (Global Positioning System) as the positioning system, and has a center frequency of 1.575 GHz, and
said digital modulator generates the digital modulated signal by digitally modulating an amplitude of the input carrier having a frequency of 500 kHz with the data unit.

5. The sensor unit according to claim 2, wherein said sensor section further includes:
   a barometric pressure sensor for detecting a barometric pressure in a vicinity of the mobile unit; and
   a temperature sensor for detecting a temperature in a vicinity of the temperature sensor, and
   said A/D converter further converts the barometric pressure detected by said barometric pressure sensor to digital barometric pressure data and the temperature detected by said temperature sensor to digital temperature data, and said processor generates the data unit to further include the digital barometric pressure data and the digital temperature data converted by said A/D converter.

6. The sensor unit according to claim 2, wherein
said combining circuit further includes:
- a high-pass filter, placed between said antenna section and said first signal line, for passing a signal having a frequency equal to or higher than a lower limit of the frequency bandwidth occupied by the high-frequency signal;
- a band-pass filter, connected to said digital modulator, for passing a signal having the frequency bandwidth occupied by the digital modulated signal; and
- a band elimination filter, placed between said second signal line and said band-pass filter, for passing a signal having a frequency outside the frequency bandwidth occupied by the high-frequency signal.

7. The sensor unit according to claim 1, further comprising:
- a substrate having at least said sensor section and said combining circuit located thereon, said substrate being accommodated in said casing; and
- an accommodation box accommodating at least one of (a) an entirety or part of said sensor section and (b) said combining circuit, said accommodation box having an upper surface tilted with respect to a bottom surface of said casing, and being formed on said substrate, wherein at least said antenna element is located on said upper surface of said accommodation box.

8. A locating unit for connecting to a sensor unit and mounting on a mobile unit, wherein the sensor unit sends a composite signal obtained by combining a high-frequency signal transmitted from an external positioning system and a digital modulated signal obtained by modulating a carrier with a data unit including at least angular velocity data indicative of an angular velocity of the mobile unit in a digital format and acceleration data indicative of an acceleration of the mobile unit in a digital format, the locating unit comprising:
- a dividing circuit for dividing, in response to reception of the composite signal sent from the sensor unit, the received composite signal into the high-frequency signal and the digital modulated signal;
- a receiver for performing, in response to reception of the high-frequency signal obtained through division by said dividing circuit, a predetermined process on the high-frequency signal and calculating a current position of the mobile unit;
- a digital demodulator for demodulating the digital modulated signal obtained through division by said dividing circuit and reproducing the data unit; and
- a processor for deriving an azimuth angle and a travel distance of the mobile unit from the angular velocity data and the acceleration data included in the data unit reproduced by said digital demodulator and calculating a current position of the mobile unit by using the azimuth angle and the travel distance.

9. The locating unit according to claim 8, wherein the data unit further includes barometric pressure data indicative of a barometric pressure in a vicinity of the mobile unit in a digital format and temperature data indicative of a temperature in a vicinity of the mobile unit in a digital format, and said processor
- derives a change in altitude of the mobile unit based on the barometric pressure data included in the data unit reproduced by said digital demodulator, and calculates the current position of the mobile unit by further using the change in altitude, and
- derives the temperature in the vicinity of the mobile unit from the temperature data included in the data unit reproduced by said digital demodulator.

10. The locating unit according to claim 9, wherein said processor further corrects the azimuth angle, the travel distance, and the change in altitude by using the temperature.

* * * * *